United States Patent
Shibata (10) Patent No.: US 8,964,048 B2
(45) Date of Patent: Feb. 24, 2015

(54) IMAGE PROCESSING APPARATUS AND IMAGE PROCESSING METHOD FOR CAMERA-SHAKE CORRECTION

(75) Inventor: Yasushi Shibata, Kanagawa (JP)

(73) Assignee: Sony Corporation, Tokyo (JP)

( * ) Notice: Subject to any disclaimer, the term of this patent is extended or adjusted under 35 U.S.C. 154(b) by 195 days.

(21) Appl. No.: 13/487,164

(22) Filed: Jun. 2, 2012

(65) Prior Publication Data

US 2012/0314094 A1 Dec. 13, 2012

(30) Foreign Application Priority Data

Jun. 9, 2011 (JP) ................. 2011-129057

(51) Int. Cl.
*H04N 5/228* (2006.01)
*G06K 9/00* (2006.01)
*H04N 5/232* (2006.01)

(52) U.S. Cl.
CPC ....... *H04N 5/23254* (2013.01); *H04N 5/23267* (2013.01)
USPC .............. 348/208.6; 348/208.1; 348/208.4; 348/208.99; 396/52; 382/107

(58) Field of Classification Search
USPC ...................................... 348/208.6
See application file for complete search history.

(56) References Cited

U.S. PATENT DOCUMENTS

| | | | | |
|---|---|---|---|---|
| 5,734,933 A | * | 3/1998 | Sekine et al. | 396/55 |
| 7,277,558 B2 | * | 10/2007 | Sefcik | 382/103 |
| 7,880,769 B2 | * | 2/2011 | Qi | 348/208.99 |
| 8,509,481 B2 | * | 8/2013 | Miyasako | 382/103 |
| 2008/0186386 A1 | * | 8/2008 | Okada et al. | 348/208.4 |
| 2012/0308080 A1 | * | 12/2012 | Hamasaki | 382/103 |

FOREIGN PATENT DOCUMENTS

JP 2008-141437 6/2008

* cited by examiner

*Primary Examiner* — Timothy J Henn
*Assistant Examiner* — Quan Pham
(74) *Attorney, Agent, or Firm* — Sony Corporation

(57) ABSTRACT

An image processing apparatus includes: a histogram computation block configured to compute a histogram of a plurality of motion vectors of each image detected for each of continuously taken images; an acceleration vector computation block configured to compute an acceleration vector corresponding to a change in the histogram; and a camera-shake correction amount computation block configured, on the basis of the acceleration vector and first motion vector for correction used in processing on an image preceding an image subject to processing, by assuming a second motion vector for correction for use in processing on the image subject to processing, to compute a camera-shake correction amount corresponding to the second motion vector for correction.

15 Claims, 6 Drawing Sheets

FIG.1A

SELECT MOTION VECTOR BY
ESTIMATING BACKGROUND AREA

FIG.1B

DETECT A MOTION VECTOR
CAUSED BY CAMERA SHAKE

IMAGE PROCESSING APPARATUS AND IMAGE PROCESSING METHOD FOR CAMERA-SHAKE CORRECTION

BACKGROUND

The present disclosure relates to an image processing apparatus, an image processing method, and a program and, more particularly, to an image processing apparatus, an image processing method, and a program that are configured to execute the processing of more stable camera-shake correction.

Recently, imaging apparatuses, such as digital video cameras, have camera-shake correction functions that allow to record images (moving images) with camera shake corrected and no blur even if a user takes images with an imaging apparatus held by his/her hand.

Related-art camera-shake correction processing operations estimate a portion in which no subject was taken from a taken image as a background portion to correct camera shake on the basis of a motion vector detected from the estimated background portion.

For example, the applicant hereof proposes an image processing method in which a face area is detected from a taken image to make the value of a weighting coefficient associated with a camera-shake amount of the face area greater than the value of a weighting coefficient associated with a camera-shake amount of a background area other than the face area, thereby executing camera-shake correction processing (refer to Japanese Patent Laid-open No. 2008-141437).

SUMMARY

However, with the related-art camera-shake correction processing, if a background portion is erroneously assumed and camera-shake correction is executed on the basis of a motion vector detected from a portion in which a moving subject is taken, the camera-shake correction is sometimes adversely affected by this moving subject. For example, the related-art camera-shake correction processing may cause a large shake in an image in accordance with the motion of a subject, thereby making it difficult to execute camera-shake correction processing with stability.

Therefore, the present disclosure addresses the above-identified and other problems associated with related-art methods and apparatuses and solves the addressed problems by providing an image processing apparatus, an image processing method, and a program that are configured to provide more stable camera-shake correction processing than the related-art technologies.

In carrying out the disclosure and according to one embodiment thereof, there is provided an image processing apparatus. This image processing apparatus has a histogram commutation block configured to compute a histogram of a plurality of motion vectors of each image detected for each of continuously taken images; an acceleration vector computation block configured to compute an acceleration vector corresponding to a change in the histogram; and a camera-shake correction amount computation block configured, on the basis of the acceleration vector and first motion vector for correction used in processing on an image preceding an image subject to processing, by assuming a second motion vector for correction for use in processing on the image subject to processing, to compute a camera-shake correction amount corresponding to the second motion vector for correction.

In carrying out the disclosure and according to one embodiment thereof, there is provided an image processing method and a program. The image processing method and the program have: computing a histogram of a plurality of motion vectors of each image detected for each of continuously taken images; computing an acceleration vector corresponding to a change in the histogram; and computing, on the basis of the acceleration vector and first motion vector for correction used in processing on an image preceding an image subject to processing, by assuming a second motion vector for correction for use in processing on the image subject to processing, a camera-shake correction amount corresponding to the second motion vector for correction.

In one embodiment of the present disclosure, a histogram of two or more motion vectors of each image detected for each continuously taken image is computed. An acceleration vector is computed that corresponds to a change in the histogram. Next, on the basis of the acceleration vector and a first motion vector for correction used in the processing on an image preceding the current image subject to processing, a second motion vector for correction for use in the processing on the image subject to processing is assumed to compute a camera-shake correction amount corresponding to the second motion vector for correction.

According to one embodiment of the present disclosure, the camera-shake correction processing more stable than related-art technologies is provided.

DETAILED DESCRIPTION OF THE PREFERRED EMBODIMENT

An embodiment of the present disclosure will be described in further detail with reference to the accompanying drawings.

Figure 1A:
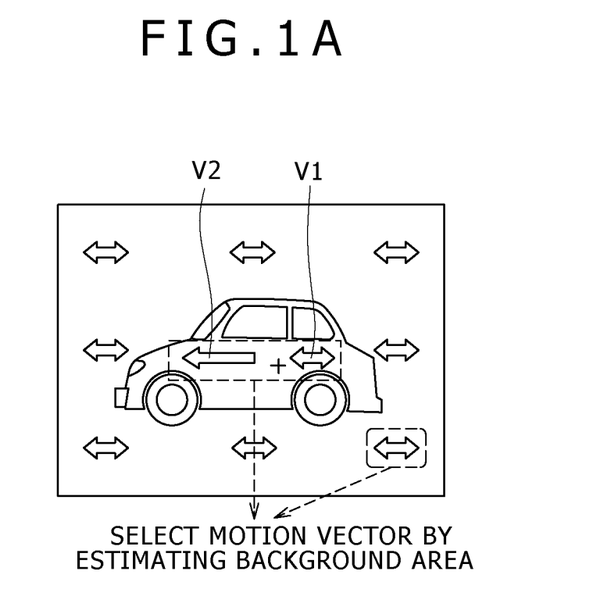
FIGS. 1A and 1B are diagrams illustrating a concept of related-art camera-shake correction processing and a concept of a camera-shake correction processing according to an embodiment of the present disclosure.
Figure 1B:
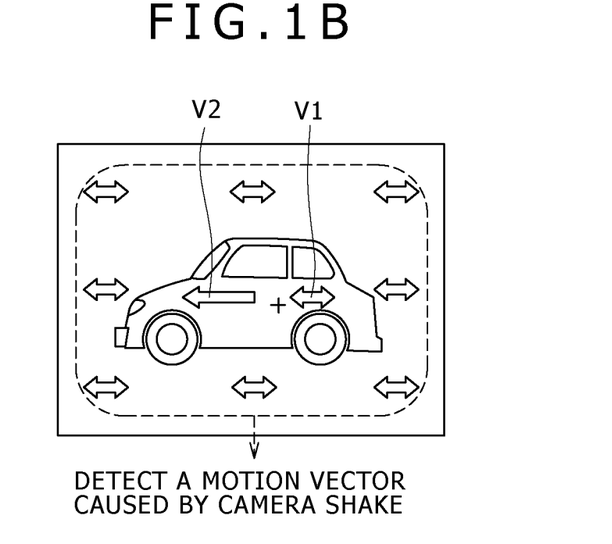

First, concepts of related-art camera-shake correction processing and camera-shake correction processing according to the technology disclosed herein will be described with reference to FIG. 1. FIG. 1A shows the concept of related-art camera-shake correction processing and FIG. 1B shows the concept of camera-shake correction processing according to the technology disclosed herein.

For example, when a user takes an image by holding an imaging apparatus in his/her hand, the image obtained by this imaging is subjected to a same motion (or a blur) all over the taken image. Consequently, when motion vectors are detected from the image, motion vectors based on camera shakes are detected from all over the image as shown in FIGS. 1A and 1B (these vectors are hereafter appropriately referred to as a global vector V1).

If a subject that moves like an automobile (hereafter appropriately referred to as a moving subject) is taken in an image, a motion vector that corresponds to a motion of this moving subject (hereafter appropriately referred to as a moving subject vector V2) is detected. Therefore, from an area in which the moving subject is taken, a vector obtained by adding the global vector V1 and the moving subject vector V2 is detected.

With the related-art camera-shake correction processing to be executed on an image in which such a moving subject is imaged, a correction motion vector for use in computation of a camera-shake correction amount for correcting camera shake is first selected from motion vectors detected from the image. For example, by analyzing the image, a background area that is an area other than an area in which a subject is imaged is assumed and a motion vector detected from this background area is selected as the motion vector for correction. Next, by computing the camera-shake correction amount corresponding to the detected correction motion vector, an image processing for camera-shake correction is executed.

Consequently, with the related-art camera-shake correction processing, if the background area can be correctly assumed, then the global vector V1 is selected as the correction motion vector and the camera-shake correction amount is computed, thereby providing correct camera-shake correction.

On the other hand, if the background area cannot be correctly assumed, then a motion vector obtained by adding the global vector V1 and the moving subject vector V2 together is selected as the correction motion vector and camera-shake correction processing is executed. However, this causes a large shake in the image as if the image is pulled by the movement of the moving subject. In addition, with a timing at which the case where the background area can be correctly assumed and the case where the background area cannot be correctly assumed are switched between, the camera-shake correction processing based on only the global vector V1 and the camera-shake correction processing based on a vector obtained by adding the global vector V1 and the moving subject vector V2 together are switched between. This causes quick changes in the camera-shake correction amount, resulting in an unnatural image.

By contrast, as described later, the camera-shake correction processing according to the technology disclosed herein computes a correction motion vector without assuming the background area, thereby preventing such a large shake from being caused as being pulled by the motion of a moving subject. Therefore, the camera-shake correction processing according to the technology disclosed herein can minimize the adverse effects due to the motion of the subject, thereby realizing more stable camera-shake correction processing.

Figure 2:
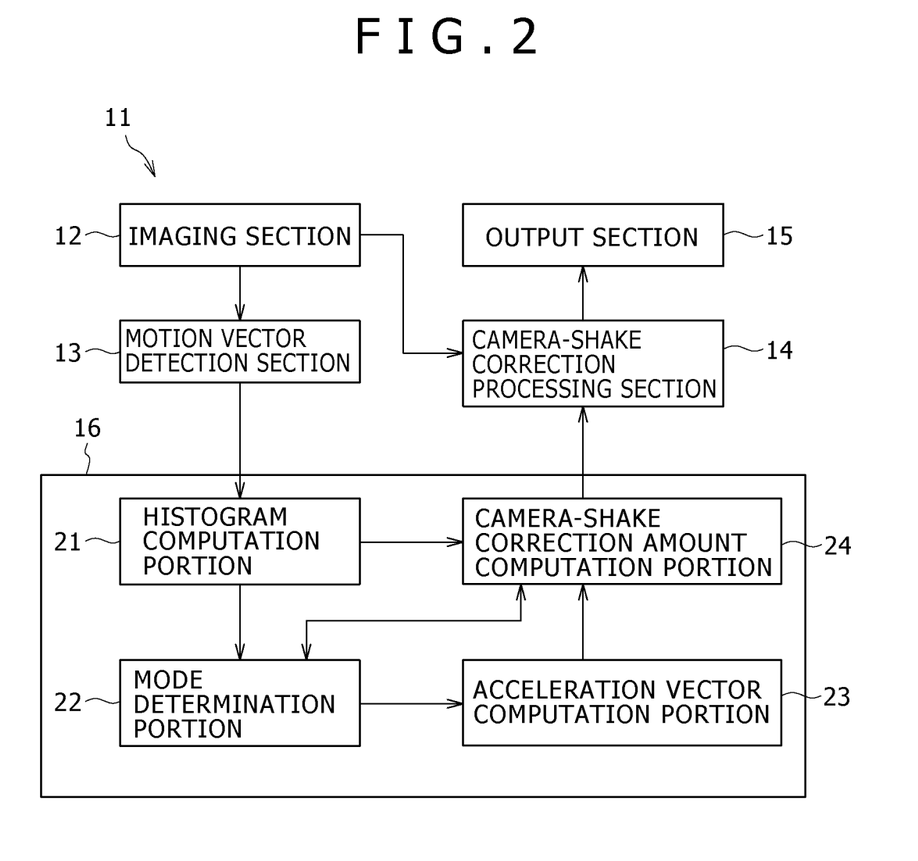
FIG. 2 is a block diagram illustrating an exemplary configuration of an imaging apparatus according to the embodiment of the present disclosure.

FIG. 2 is a block diagram illustrating an exemplary configuration of an imaging apparatus according to the embodiment of the technology disclosed herein.

An imaging apparatus 11 is an apparatus that can take a moving image like a digital video camera and has an imaging section 12, a motion vector detection section 13, a camera-shake correction processing section 14, an output section 15, and a correction amount computation section 16.

The imaging section 12 includes a solid-state imaging device, such as a CCD (Charge Coupled Device) or a CMOS (Complementary Metal Oxide Semiconductor) sensor, and a memory that can operate at high speeds. Images continuously taken by the imaging section 12, namely, images that are continuously taken by the solid-state imaging device to be sequentially stored in the memory are then supplied to the motion vector detection section 13 and the camera-shake correction processing section 14.

By sequentially analyzing the images continuously taken by the imaging section 12, the motion vector detection section 13 detects two or more motion vectors from each of the images, supplying the detected motion vectors to the correction amount computation section 16.

For example, the motion vector detection section 13 reads images for two frames from the memory of the imaging section 12 to execute matching between the last frame and the current frame on a block-by-block basis, the blocks being obtained by partitioning the current frame. Next, the motion vector detection section 13 determines an area in which an image of each block was taken in the last frame and, in accordance with a distance and a direction between the determined area and the block with which the matching has been done, obtains a motion vector of this block. The motion vector detection section 13 can execute this processing on all of the blocks obtained by partitioning the current frame to detect two or more motion vectors from the current frame.

To the camera-shake correction processing section 14, a camera-shake correction amount computed by the correction amount computation section 16 is supplied. On the basis of the supplied camera-shake correction amount, the camera-shake correction processing section 14 executes image processing for shifting the images taken by the imaging section 12. Consequently, the camera-shake in the images taken by the imaging section 12 is corrected. The camera-shake correction processing section 14 supplies the images with camera-shake corrected to the output section 15.

The output section 15, for example connected to a display or a recording media (not shown), outputs images supplied from the camera-shake correction processing section 14 to display the images on the display or record the images to the recording media.

The correction amount computation section 16 computes a camera-shake correction amount used for the camera-shake correction processing by the camera-shake correction processing section 14 from two or more motion vectors of each of the images supplied from the motion vector detection section 13 and supplies the obtained camera-shake correction amount to the camera-shake correction processing section 14. The correction amount computation section 16 has a histogram computation portion 21, a mode determination portion 22, an acceleration vector computation portion 23, and a camera-shake correction amount computation portion 24.

The motion vectors obtained from the two or more blocks obtained by partitioning an image taken by the imaging section 12 are supplied from the motion vector detection section 13 to the histogram computation portion 21 that computes a histogram indicative of the degrees of these motion vectors. Therefore, the shape of the histogram computed by the histogram computation portion 21 depends on whether a moving subject is taken in an image or not.

For example, if no moving subject is taken in the image, then the histogram computed by the histogram computation portion 21 has a shape having one peak corresponding to the global vector V1. If a moving subject is taken in the image, then the histogram computed by the histogram computation portion 21 has a shape having two or more peaks corresponding to the global vector V1 and the moving subject vector V2 obtained on the basis of the movement of the moving subject.

On the basis of the histogram computed by the histogram computation portion 21 and a camera-shake correction amount computed by the camera-shake correction amount computation portion 24, the mode determination portion 22 determines an operation mode in which to compute a camera-shake correction amount in the correction amount computation section 16. The operation mode of the correction amount computation section 16 includes a normal mode in which no moving subject is taken, a moving subject mode in which a moving subject is taken, and a return mode in which the moving subject mode is returned to the normal mode.

The mode determination portion 22 determines the operation mode of the correction amount computation section 16 and notifies the camera-shake correction amount computation portion 24 of the determined operation mode, namely, the normal mode, the moving subject mode, or the return mode. If the operation mode of the correction amount computation section 16 is the moving subject mode or the return mode, the mode determination portion 22 supplies the histogram obtained from the histogram computation portion 21 to the acceleration vector computation portion 23.

If the histogram is supplied from the mode determination portion 22, namely, if the operation mode of the correction amount computation section 16 is the moving subject mode or the return mode, the acceleration vector computation portion 23 computes an acceleration vector corresponding to a change of the supplied histogram. For example, the acceleration vector computation portion 23 executes block matching between the histogram of a motion vector in the current frame and the histogram of a motion vector in the last frame. Consequently, the acceleration vector computation portion 23 computes the acceleration vector indicative of a change of the motion vectors between frames.

The camera-shake correction amount computation portion 24 is informed of the operation mode of the correction amount computation section 16 determined by the mode determination portion 22. The camera-shake correction amount computation portion 24 computes a camera-shake correction amount corresponding to the received operation mode and supplies the computed camera-shake correction amount to the camera-shake correction processing section 14.

For example, if the operation mode of the correction amount computation section 16 is the normal mode, then the shape of the histogram supplied from the histogram computation portion 21 to the camera-shake correction amount computation portion 24 has one peak. To be more specific, in this case, a histogram having a shape in which a peak is found in the global vector V1 that is caused by a camera-shake all over a screen is obtained. Therefore, in this case, the camera-shake correction amount computation portion 24 selects a global vector V1 with a maximized histogram degree as the correction motion vector to compute a camera-shake correction amount for the direction and size corresponding to the selected correction motion vector.

If the operation mode of the correction amount computation section 16 is the moving subject mode, then the acceleration vector computed by the acceleration vector computation portion 23 is supplied to the camera-shake correction amount computation portion 24. In this case, the shape of the histogram supplied from the histogram computation portion 21 to the camera-shake correction amount computation portion 24 has two or more peaks.

Therefore, in this case, the camera-shake correction amount computation portion 24 computes (or assumes) a correction motion vector for use in the processing on the current frame on the basis of the correction motion vector used in computation of a camera-shake correction amount in the processing of the last frame and the acceleration vector supplied from the acceleration vector computation portion 23. For example, by adding the acceleration vector to the correction motion vector used in the processing of the last frame, the camera-shake correction amount computation portion 24 computes a correction motion vector for use in the current frame. Namely, the correction amount computation section 16 assumes a correction motion vector by use of the acceleration vector obtained in accordance with the change of a motion vector rather than assuming the background of an image to provide a correction motion vector that is a motion vector detected from the background area.

If the operation mode of the correction amount computation section 16 is the return mode, then the acceleration vector computed by the acceleration vector computation portion 23 is supplied to the camera-shake correction amount computation portion 24. Next, the camera-shake correction amount computation portion 24 computes a correction motion vector in the current frame on the basis of the correction motion vector used for computation of the camera-shake correction amount in the processing of the last frame, the acceleration vector supplied from the acceleration vector computation portion 23, the global vector V1 with the maximized histogram degree, and a predetermined return coefficient.

In the return mode, the correction motion vector used for computation of a camera-shake correction amount by the camera-shake correction amount computation portion 24 and the global vector V1 with the maximized histogram degree are supplied also to the mode determination portion 22 to determine whether or not to transition from the return mode to the normal mode in the mode determination portion 22.

As described above, in the imaging apparatus 11, the operation mode of the correction amount computation section 16 is determined in accordance with the histogram of a motion vector detected from an image, and camera-shake correction processing is executed with a camera-shake correction amount computed in accordance with each operation mode.

Figure 3:
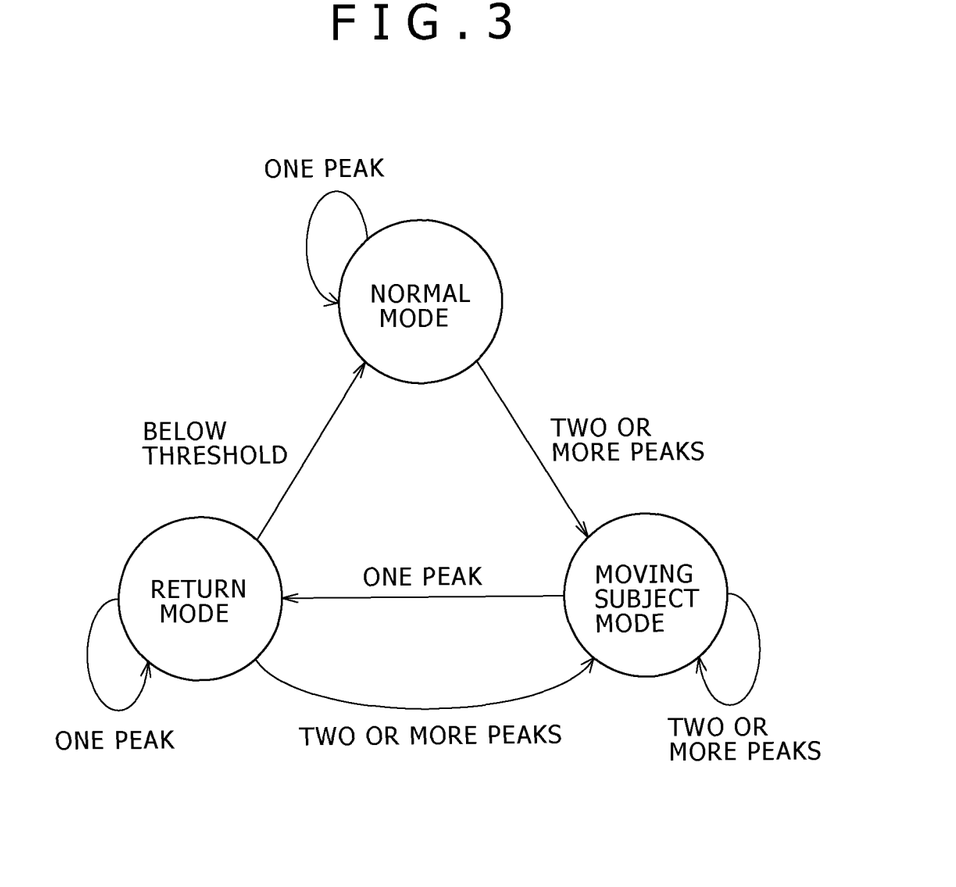
FIG. 3 is a mode transition diagram illustrating transitions of operation modes of a correction amount computation section.

The following describes the transitions of the operation modes of the correction amount computation section 16 with reference to FIG. 3.

First, when the imaging apparatus 11 is started up, the operation mode of the correction amount computation section 16 enters the normal mode as the initial setting. Next, when the operation mode of the correction amount computation section 16 is the normal mode, the mode determination portion 22 maintains the normal mode if the histogram computed by the histogram computation portion 21 has a shape having one peak. Then, when the operation mode of the correction amount computation section 16 is the normal mode, the mode determination portion 22 transitions the operation mode of the correction amount computation section 16 to the moving subject mode if the histogram computed by the histogram computation portion 21 changes the shape thereof to have two or more peaks.

Further, when the operation mode of the correction amount computation section 16 is the moving subject mode, the mode determination portion 22 keeps the moving subject mode if the histogram computed by the histogram computation portion 21 has a shape having two or more peaks. On the other hand, when the operation mode of the correction amount computation section 16 is the moving subject mode, the mode determination portion 22 transitions the operation mode of the correction amount computation section 16 to the return mode if the histogram computed by the histogram computation portion 21 changes the shape thereof to have one peak.

Then, when the operation mode of the correction amount computation section 16 is the return mode, the mode determination portion 22 keeps the return mode if the histogram computed by the histogram computation portion 21 has a shape having one peak. Further, when the operation mode of the correction amount computation section 16 is the return mode, the mode determination portion 22 transitions the operation mode of the correction amount computation section 16 to the moving subject mode if the histogram computed by the histogram computation portion 21 changes the shape thereof to have two or more peaks. On the other hand, when the operation mode of the correction amount computation section 16 is the return mode, the mode determination portion 22 transitions the operation mode of the correction amount computation section 16 to the normal mode if a difference between a vector obtained by adding the acceleration vector supplied from the acceleration vector computation portion 23 to the correction motion vector of the last frame and the global vector V1 computed from the current frame gets below a threshold value.

As described above, in the imaging apparatus 11, the operation modes of the correction amount computation section 16 transitions from one to the other, and the camera-shake correction amount computation portion 24 computes a camera-shake correction amount corresponding to the operation mode of the correction amount computation section 16.

Figure 4:
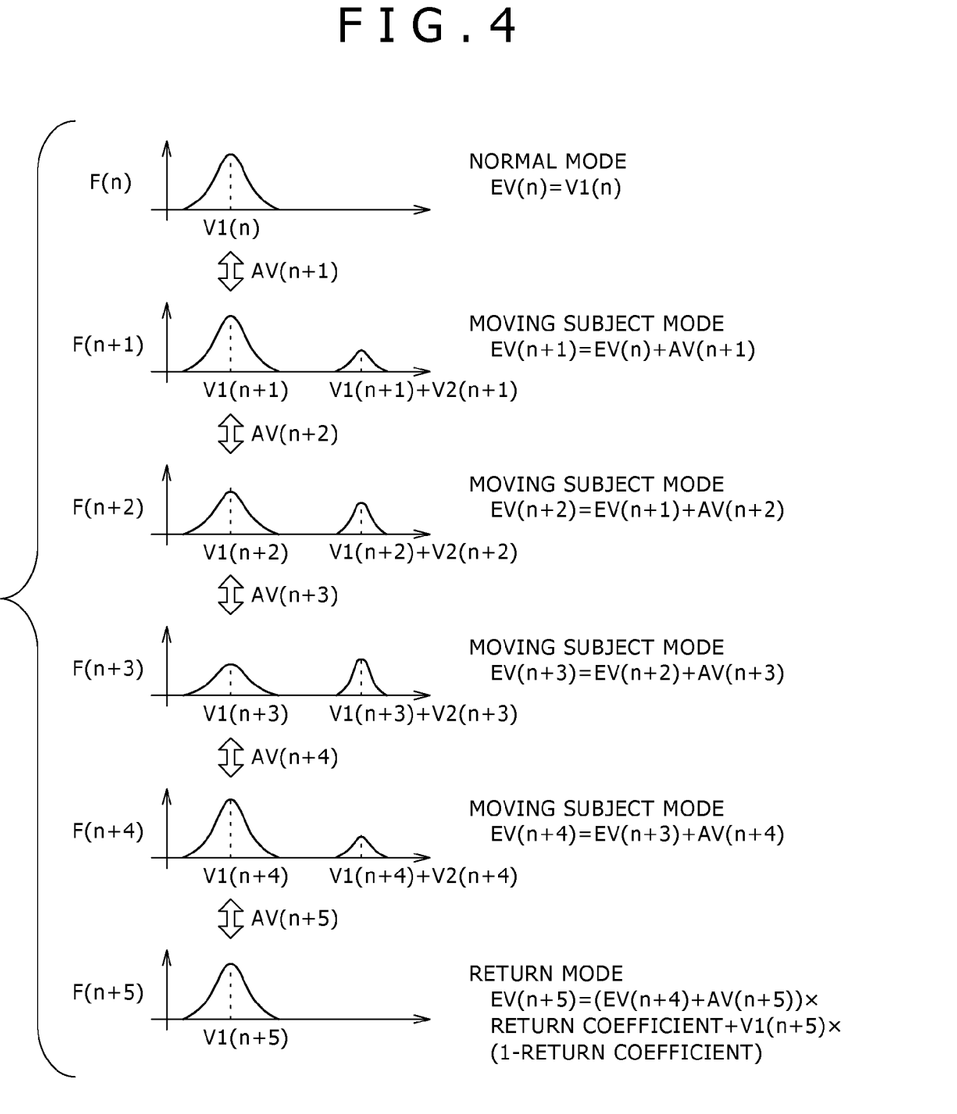
FIG. 4 is a diagram illustrating examples of computations of correction motion vectors.

The following describes an example of computing motion vectors for correction with reference to FIG. 4, for example.

If no moving subject is taken in an image in an nth frame F(n) for example, a histogram of a motion vector detected from the nth frame F(n) has a shape in which there is one peak. At this moment, the motion vector with having a peak in the histogram is obtained as a global vector V1(n) caused by a camera shake all over the screen. In this case, the mode determination portion 22 determines that the operation mode of the correction amount computation section 16 is the normal mode. Accordingly, the camera-shake correction amount computation portion 24 uses the global vector V1(n) as a motion vector for correction EV(n) (namely, EV(n)=V1(n)), thereby computing a camera-shake correction amount from the motion vector for correction EV (n).

Next, if one moving subject is taken in an n+1th frame F(n+1), then the histogram of a motion vector detected from the n+1th frame F(n+1) has a shape in which there are two peaks. Namely, a histogram is computed that has a shape in which there are two peaks; a global vector V1(n+1) caused by a camera shake all over the screen and vector V1(n+1)+V2 (n+1) obtained by adding global vector V1(n+1) and a moving subject vector V2(n+1) caused in accordance with the movement of the moving subject.

In this case, the mode determination portion 22 determines that the operation mode of the correction amount computation section 16 is the moving subject mode. Accordingly, the acceleration vector computation portion 23 executes matching between the histogram of the nth frame F(n) and the histogram of the n+1th frame F(n+1) to compute an acceleration vector AV(n+1) indicative of a change of global vector V1(n+1). Further, the camera-shake correction amount computation portion 24 adds the motion vector for correction EV(n) used in the processing of the nth frame F(n) and the acceleration vector AV(n+1) to compute a motion vector for correction EV(n+1) for use in the processing of the n+1th frame F(n+1) (namely, EV(n+1)=EV(n)+AV(n+1)). Next, the camera-shake correction amount computation portion 24 computes a camera-shake correction amount from the motion vector for correction EV(n+1).

Likewise, in an n+2th frame F(n+2), the moving subject mode is determined and a motion vector for correction EV(n+2) is computed by adding motion vector for correction of the last frame EV(n+1) and an acceleration vector AV(n+2).

It should be noted that, as shown in the histogram of an n+3th frame F(n+3), the degree of vector V1(n+3)+V2(n+3) of an area in which a moving subject is taken may become higher than the degree of a global vector V1(n+3) depending on the ratio of the area in which the moving subject is taken to the entire image, for example. In such a case, the camera-shake correction amount computation portion 24 obtains a motion vector for correction EV(n+3) by adding a motion vector for correction EV(n+2) of the last frame and an acceleration vector AV(n+3). Namely, in the correction amount computation section 16, a vector having a higher degree, namely, vector V1(n+3) and vector V2(n+3) of an area in which a moving subject is taken is not used for the motion vector for correction EV(n+3).

Likewise, in an n+4th frame F(n+4), the moving subject mode is determined and a motion vector for correction EV(n+4) is computed by adding the motion vector for correction EV(n+3) of the last frame and an acceleration vector AV(n+4).

Next, if no moving subject is taken in the image in an n+5th frame F(n+5), then a histogram of a motion vector detected from the n+5th frame F(n+5) has a shape in which there is one peak. In this case, the mode determination portion 22 determines that the operation mode of the correction amount computation section 16 is the return mode.

Accordingly, the camera-shake correction amount computation portion 24 α-blends a vector obtained by adding the motion vector for correction EV(n+4) used in the processing of the n+4th frame F(n+4) and an acceleration vector AV(n+5) with a global vector V1(n+5) of the n+5th frame F(n+5) in accordance with a return coefficient. Consequently, a motion vector for correction EV(n+5) for use in the processing on the n+5th frame F(n+5) is computed (namely, EV(n+5)=(EV(n+4)+AV(n+5))×return coefficient+V1(n+5)×(1−return coefficient)). Then, the camera-shake correction amount computation portion 24 computes a camera-shake correction amount from the motion vector for correction EV(n+5).

In the return mode, the motion vector for correction EV(n+5) computed by the camera-shake correction amount computation portion 24 and the global vector V1(n+5) are used in determining by the mode determination portion 22 whether transition is made from the return mode to the normal mode. For example, if a difference between the motion vector for correction EV(n+5) and the global vector V1(n+5) detected from the n+5th frame F(n+5) gets below a predetermined threshold value (EV(n+5)−V1(n+5)<threshold value), then the mode determination portion 22 determines that transition is made from the return mode to the normal mode.

To be more specific, in the case of the return mode, by α-blending the motion vector for correction EV in the moving subject mode with the global vector V1 in accordance with a return coefficient, the motion vector for correction EV in the moving subject mode gradually becomes a motion vector close to the global vector V1. Therefore, the occurrence of an unnatural image caused by a drastic change in a camera-shake correction amount may be suppressed more efficiently than the case where, if transition is made from the moving subject mode directly to the normal mode when the above-mentioned difference gets below a predetermined threshold level, making transition from the return mode to the normal mode. Further, in the case of the return mode, a return coefficient for use in α-blending may be adjusted to appropriately adjust the manner in which the motion vector for correction EV changes in returning from the moving subject mode to the normal mode.

Figure 5:
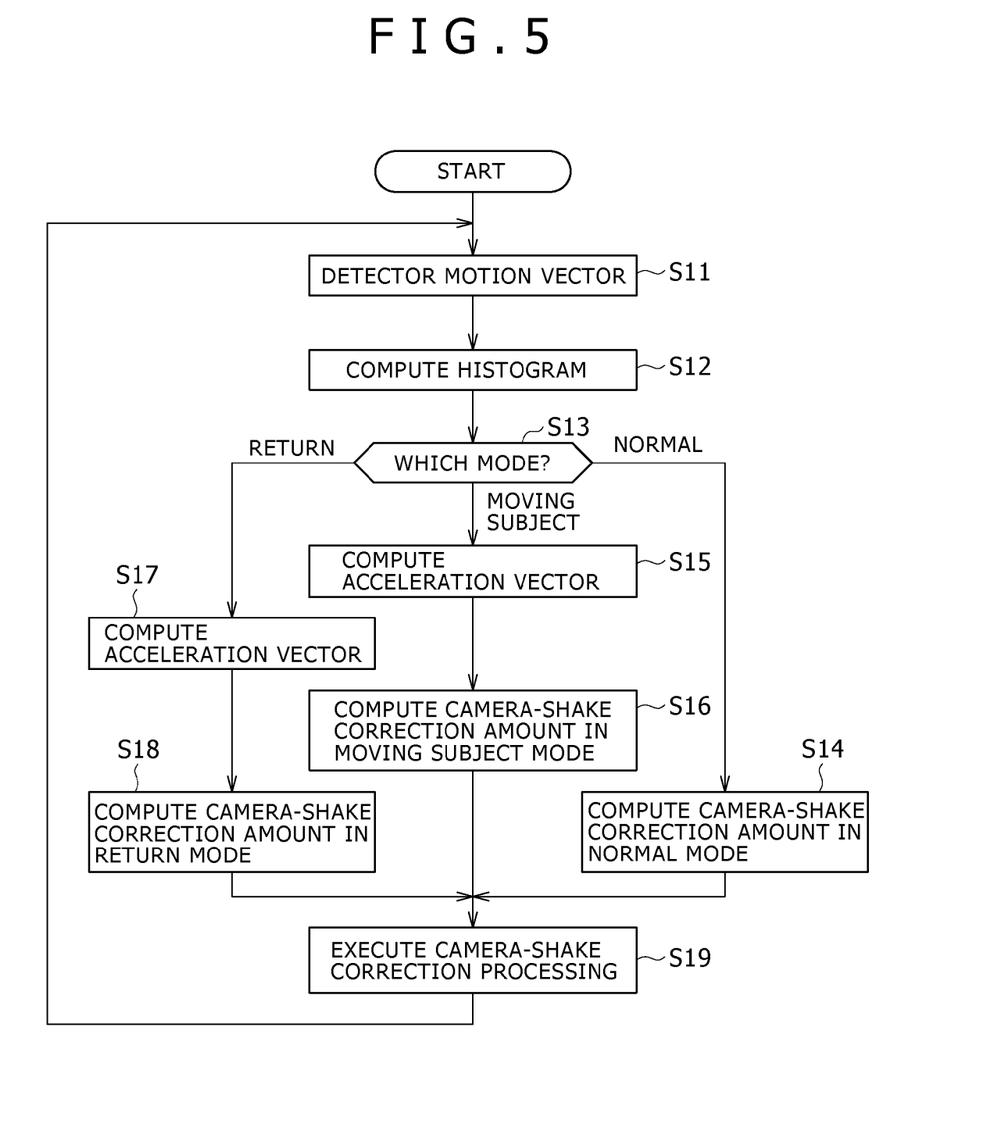
FIG. 5 is a flowchart indicative of camera-shake correction processing.

Referring to FIG. 5, there is shown a flowchart indicative of camera-shake correction processing to be executed in the imaging apparatus 11.

The imaging section 12 starts taking an image. The taken image is supplied to the motion vector detection section 13 and the camera-shake correction processing section 14, upon which processing starts. In step S11, the motion vector detection section 13 analyzes the image supplied from the imaging section 12 to detect two or more motion vectors. The motion vector detection section 13 supplies the detected motion vectors to the histogram computation portion 21 of the correction amount computation section 16.

In step S12, the histogram computation portion 21 computes a histogram about two or more motion vectors detected by the motion vector detection section 13 and supplies the computed histogram to the mode determination portion 22 and the camera-shake correction amount computation portion 24.

In step S13, the mode determination portion 22 determines the operation mode of the correction amount computation section 16 to be any one of the normal mode, the moving subject mode, and the return mode in accordance with the mode transition diagram shown in FIG. 3.

If the operation mode of the correction amount computation section 16 is found by the mode determination portion 22 to be the normal mode in step S13, then the procedure goes to step S14. In step S14, the camera-shake correction amount computation portion 24 computes a camera-shake correction amount in the normal mode and supplies the computed camera-shake correction amount to the camera-shake correction processing section 14.

On the other hand, if the operation mode of the correction amount computation section 16 is found by the mode determination portion 22 to be the moving subject mode in step S13, then the procedure goes to step S15. In step S15, the acceleration vector computation portion 23 computes an acceleration vector corresponding to a change of motion vectors between frames. In step S16, the camera-shake correction amount computation portion 24 computes a camera-shake correction amount in the moving subject mode and supplies the computed camera-shake correction amount to the camera-shake correction processing section 14.

On the other hand, if the operation mode of the correction amount computation section 16 is found by the mode determination portion 22 to be the return mode in step S13, then the procedure goes to step S17. In step S17, the acceleration vector computation portion 23 computes an acceleration vector corresponding to a change of motion vectors between frames. In step S18, the camera-shake correction amount computation portion 24 computes a camera shake correction amount in the return mode and supplies the computed camera-shake correction amount to the camera-shake correction processing section 14.

After the processing operation of step S14, S16, or S18, the procedure goes to step S19, in which the camera-shake correction processing section 14 executes camera-shake correction processing on the image supplied from the imaging section 12 on the basis of the camera-shake correction amount computed by the camera-shake correction amount computation portion 24. After the processing operation of step S19, the procedure returns to step S11 to repeat the above-mentioned processing operations on a next image (or frame).

As described above, in the imaging apparatus 11, the operation modes of the correction amount computation section 16 are transitioned in accordance with the shape of a histogram of a motion vector detected from an image, so that a proper camera-shake correction amount can be computed depending on the image, namely, whether a moving subject is taken or not. To be more specific, in the imaging apparatus 11, if the operation mode of the correction amount computation section 16 is the moving subject mode, a motion vector for correction for use in the processing on a frame subject to processing is computed (or assumed) on the basis of an acceleration vector corresponding to a change in a histogram and a motion vector for correction of the last frame, so that camera-shake correction can be executed with stability.

To be more specific, in the imaging apparatus 11, if a moving subject is taken in an image, a motion vector for correction is computed by use of a motion vector detected from the entire image including the background area and the moving subject area thereof rather than using a technique of assuming the background area as practiced in the past. Therefore, as described before with reference to FIG. 1, whereas the related-art camera-shake correction processing causes a large blur as if pulled by a moving subject if there is an error in the assumption of a background area, the imaging apparatus 11 does not involve the assumption of a background area to avoid the occurrence of such a large blur even in a situation where in the related-art processing, background area assumption provides an error. This novel configuration allows the imaging apparatus 11 to execute the more stable camera-shake correction processing than the related-art processing, thereby reducing the adverse effects due to the movements of a moving subject.

Further, in the imaging apparatus 11, if the operation mode of the correction amount computation section 16 is the return mode, by α-blending a motion vector for correction in the moving subject mode with a global vector in accordance with a return coefficient, the motion vector for correction in the moving subject mode gradually becomes a motion vector close to the global vector, so that the moving subject mode slowly transitions to the normal mode. Consequently, the camera-shake correction processing can be realized in which an unnatural image caused by a quick change in a camera-shake correction amount is prevented.

It should be noted that the technology disclosed herein is applicable to apparatuses, such as digital still cameras and mobile telephones that are capable of taking moving images, in addition to digital video cameras.

It should be noted that the above-mentioned sequence of processing operations may be executed by software as well as hardware. When the above-mentioned sequence of processing operations is executed by software, the programs constituting the software are installed in a computer which is built in dedicated hardware equipment or installed, from a program recording medium, into a general-purpose personal computer for example in which various programs may be installed for the execution of various functions.

Figure 6:
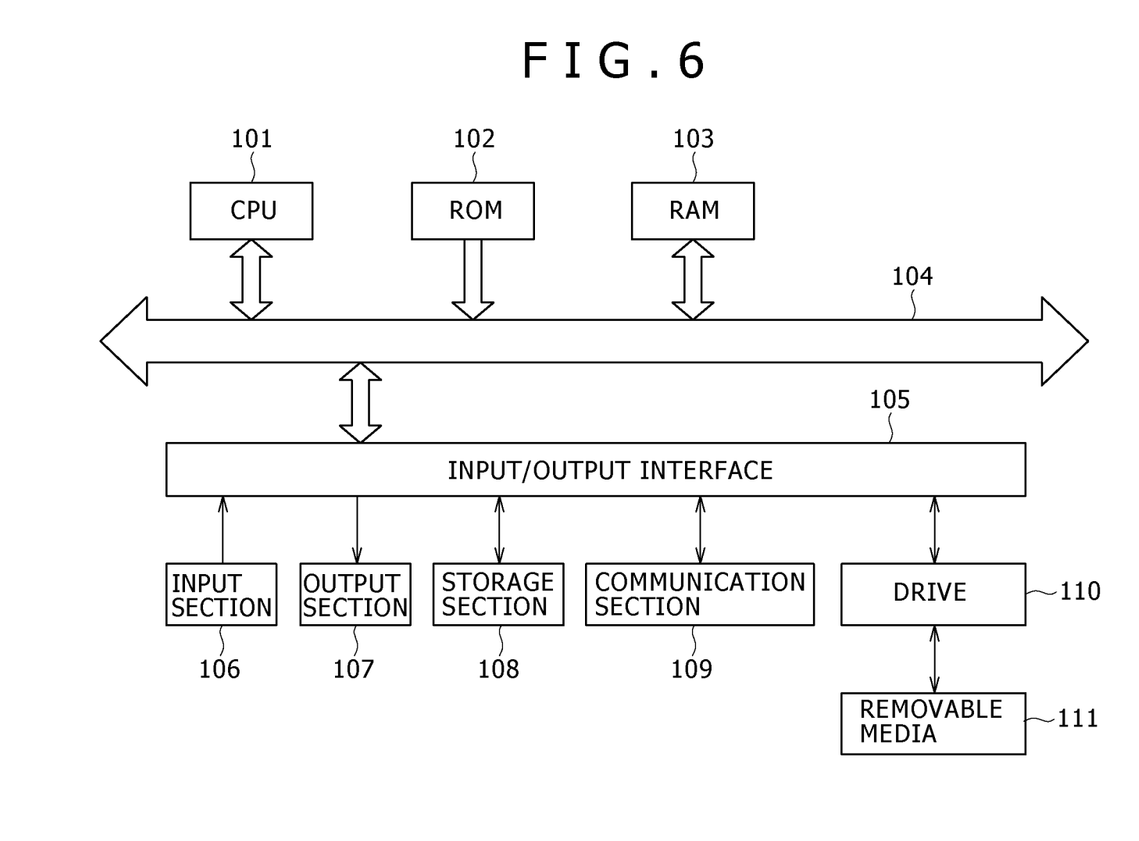
FIG. 6 is a block diagram illustrating an exemplary hardware configuration of a computer.

Referring to FIG. 6, there is shown a block diagram illustrating an exemplary hardware configuration of a computer that executes the above-mentioned sequence of processing operations by software programs.

In the computer, a CPU (Central Processing Unit) 101, a ROM (Read Only Memory) 102, and a RAM (Random Access Memory) 103 are interconnected by a bus 104.

The bus 104 is further connected to an input/output interface 105. The input/output interface 105 is connected to an input section 106 having a keyboard, a mouse, a microphone, and the like, an output section 107 having a display, a loudspeaker, and the like, a storage section 108 based on a hard disk drive, nonvolatile memory, or the like, a communication section 109 based on a network interface for example, and a drive 110 for driving a removable media 111 such as a magnetic disk, an optical disk, a magneto-optical disk, or a semiconductor memory.

In the computer configured as described above, the CPU 101 loads a program from the recording section 108 into the RAM 103 through the input/output interface 105 and the bus 104 and executes the loaded program, thereby executing the sequence of processing operations described above.

Programs to be executed by the computer (the CPU 101) may be provided as recorded to a removable media 111 that is a package media based on a magnetic disk (including a flexible disk), an optical disk (CD-ROM (Compact Disc-Read Only Memory), a DVD (Digital Versatile Disc), etc.) a magneto-optical disk, or a semiconductor memory or as transmitted via wired or wireless transmission media, such as a local area network, the Internet, or a digital satellite broadcasting, for example.

Each program may be installed in the storage section 108 via the input/output interface 105 by loading the removable media 111 in which each program is recorded onto the drive 110. In addition, each program may be received at the communication section 109 via wired or wireless transmission media to be installed in the storage section 108. Alternatively, each program may be installed in the ROM 102 or the storage section 108 in advance.

It should be noted that each program to be executed by the computer can be executed in a time-dependent manner along a sequence described herein or in parallel or on an on-demand basis. Each program may be processed by a single CPU or by a two or more CPUs in a distributed manner. Besides, each program may be transferred to a remote computer and executed therein.

It should be noted that the technology disclosed herein can take a configuration described below.

(1) An image processing apparatus including:
a histogram computation block configured to compute a histogram of a plurality of motion vectors of each image detected for each of continuously taken images;
an acceleration vector computation block configured to compute an acceleration vector corresponding to a change in the histogram; and
a camera-shake correction amount computation block configured, on the basis of the acceleration vector and first motion vector for correction used in processing on an image preceding an image subject to processing, by assuming a second motion vector for correction for use in processing on the image subject to processing, to compute a camera-shake correction amount corresponding to the second motion vector for correction.

(2) The image processing apparatus according to (1) above, further including:
a determination block configured to determine processing in the camera-shake correction amount computation block in accordance with a shape of the histogram; and
a camera-shake correction processing block configured to execute camera-shake correction processing on the image with the camera-shake correction amount computed by the camera-shake correction computation block in accordance with processing determined by the determination block.

(3) The image processing apparatus according to (2) above, in which, if the histogram has a shape in which there is a plurality of peaks, the determination block determines the processing of the camera-shake correction amount computation block such that the second motion vector for correction is assumed on the basis of the acceleration vector and the first motion vector for correction.

(4) The image processing apparatus according to (2) or (3) above, in which, if the histogram has a shape in which there is a single peak, the determination block determines the processing of the camera-shake correction amount computation block such that the motion vector corresponding to the peak of the histogram is used as the second motion vector.

(5) The image processing apparatus according to any one of (2) through (4) above, in which, if the histogram changes from the shape in which there is a plurality of peaks to the shape in which there is a single peak, the determination block determines the processing of the camera-shake correction amount computation block such that the second motion vector is assumed on the basis of the acceleration vector, the first motion vector for correction, the motion vector corresponding to the peak of the histogram, and a predetermined return coefficient.

(6) The image processing apparatus according to any one of (2) through (5) above, in which, if the processing of the camera-shake correction amount computation block assumes the second motion vector for correction on the basis of the acceleration vector, the first motion vector for correction, the motion vector corresponding to the peak of the histogram, and a predetermined return coefficient, the determination block changes the processing of the camera-shake correction amount computation block such that the vector corresponding to the peak of the histogram is used as the second motion vector for correction when a difference between the second motion vector for correction assumed by the camera-shake correction amount computation block and the motion vector corresponding to the peak of the histogram computed by the histogram computation block from the image subject to processing gets below a predetermined threshold value.

While preferred embodiments of the present disclosure have been described using specific terms, such description is for illustrative purpose only, and it is to be understood that changes and variations may be made without departing from the spirit or scope of the following claims.

The present disclosure contains subject matter related to that disclosed in Japanese Priority Patent Application JP 2011-129057 filed in the Japan Patent Office on Jun. 9, 2011, the entire content of which is hereby incorporated by reference.

What is claimed is:

1. An image processing apparatus comprising:
one or more processors operable to:
compute a histogram of a plurality of motion vectors of each image of a plurality of images;
compute an acceleration vector corresponding to a change in said histogram; and
compute a camera-shake correction amount, comprising:
computing, based on said acceleration vector and a first motion vector used in processing a first image, a second motion vector for use in processing a second image subject to processing, wherein said first image precedes said second image,
wherein said camera-shake correction amount corresponds to said second motion vector of said second image.

2. The image processing apparatus according to claim 1, wherein the one or more processors are operable to:
determine first processing based on a shape of said histogram; and
execute camera-shake correction processing on said second image with said computed camera-shake correction amount based on said first processing.

3. The image processing apparatus according to claim 2, wherein, when said histogram comprises a plurality of peaks, said first processing is determined such that said second motion vector is computed based on said acceleration vector and said first motion vector.

4. The image processing apparatus according to claim 2, wherein, when said histogram comprises a single peak, said first processing is determined such that a motion vector corresponding to said single peak of said histogram is used as said second motion vector.

5. The image processing apparatus according to claim 2, wherein, when said histogram changes from a shape having a plurality of peaks to another shape having a single peak, said first processing is determined such that said second motion vector is computed based on said acceleration vector, said first motion vector, a motion vector corresponding to said single peak of said histogram, and a predetermined return coefficient.

6. The image processing apparatus according to claim 5, wherein, when said second motion vector is computed based on said acceleration vector, said first motion vector, said motion vector corresponding to said single peak of said histogram, and said predetermined return coefficient, said first processing is changed such that said motion vector corresponding to said single peak of said histogram is used as said second motion vector for correction when a difference between said computed second motion vector and said motion vector corresponding to said single peak of said histogram from said second image subject to processing is lower than a predetermined threshold value.

7. An image processing method comprising:
   computing a histogram of a plurality of motion vectors of each image of a plurality of images;
   computing an acceleration vector corresponding to a change in said histogram; and
   computing a camera-shake correction amount comprising:
   computing, based on said acceleration vector and a first motion vector used in processing a first image, a second motion vector for use in processing a second image subject to processing, wherein said camera-shake correction amount corresponds to said second motion vector of said second image.

8. A non-transitory computer-readable storage medium having stored thereon, a computer program having at least one code section for processing, the at least one code section being executable by a computer for causing the computer to perform steps comprising:
   computing a histogram of a plurality of motion vectors of each image of a plurality of images;
   computing an acceleration vector corresponding to a change in said histogram; and
   computing a camera-shake correction amount comprising:
   computing, based on said acceleration vector and a first motion vector used in processing a first image, a second motion vector for use in processing a second image subject to processing, wherein said camera-shake correction amount corresponds to said second motion vector of said second image.

9. The image processing apparatus according to claim 1, wherein said one or more processors are operable to detect said plurality of motion vectors in said each image.

10. The image processing apparatus according to claim 1, wherein said one or more processors are operable to compute said acceleration vector based on a matching between a histogram of said first image of said plurality of images and a histogram of said second image succeeding said first image.

11. The image processing apparatus according to claim 1, wherein said camera-shake correction amount is computed by adding said acceleration vector and said first motion vector.

12. The image processing apparatus according to claim 1, wherein said one or more processors are operable to determine an operation mode corresponding to an image of said plurality of images based on said histogram.

13. The image processing apparatus according to claim 12, wherein said operation mode comprises a normal mode, a moving mode and a return mode.

14. The image processing apparatus according to claim 13, wherein, when said histogram comprises a single peak, said normal mode is determined.

15. The image processing apparatus according to claim 13, wherein, when said histogram comprises a plurality of peaks, said moving mode is determined.

* * * * *